(12) United States Patent
Robrecht et al.

(10) Patent No.: US 7,348,969 B2
(45) Date of Patent: Mar. 25, 2008

(54) PASSIVE LIGHT STYLUS AND USER INPUT DEVICE USING SAME

(75) Inventors: Michael J. Robrecht, Shorewood, WI (US); Bernard O. Geaghan, Salem, NH (US)

(73) Assignee: 3M Innovative Properties Company, St. Paul, MN (US)

( * ) Notice: Subject to any disclaimer, the term of this patent is extended or adjusted under 35 U.S.C. 154(b) by 649 days.

(21) Appl. No.: 10/748,880

(22) Filed: Dec. 30, 2003

(65) Prior Publication Data

US 2005/0146517 A1   Jul. 7, 2005

(51) Int. Cl.
*G06F 3/033* (2006.01)

(52) U.S. Cl. .................... 345/179; 178/19.05

(58) Field of Classification Search ........ 345/179–183; 178/19.01, 19.05
See application file for complete search history.

(56) References Cited

U.S. PATENT DOCUMENTS

| | | | |
|---|---|---|---|
| 4,320,292 A | | 3/1982 | Oikawa et al. |
| 4,705,942 A | * | 11/1987 | Budrikis et al. ....... 250/227.13 |
| 4,782,328 A | | 11/1988 | Denlinger |
| 4,800,257 A | * | 1/1989 | Johner .................... 235/462.49 |
| 5,484,966 A | * | 1/1996 | Segen ...................... 178/18.09 |
| 5,514,861 A | * | 5/1996 | Swartz et al. .......... 235/462.44 |
| 5,838,308 A | | 11/1998 | Knapp et al. |
| 6,028,581 A | | 2/2000 | Umeya |
| 6,080,467 A | | 6/2000 | Weber et al. |
| 6,151,015 A | | 11/2000 | Badyal et al. |
| 6,172,668 B1 | * | 1/2001 | Baur .......................... 345/182 |
| 6,337,918 B1 | | 1/2002 | Holehan |
| 6,603,463 B1 | | 8/2003 | Rising, III |
| 2002/0097232 A1 | * | 7/2002 | Pogatetz et al. ............ 345/179 |
| 2003/0095708 A1 | | 5/2003 | Pittel |
| 2005/0237313 A1 | | 10/2005 | Yoshida |
| 2005/0264523 A1 | | 12/2005 | Yoshida et al. |
| 2006/0170658 A1 | | 8/2006 | Nakamura et al. |

FOREIGN PATENT DOCUMENTS

| | | |
|---|---|---|
| EP | 0 595 482 | 5/1994 |
| JP | 58-086674 | 5/1983 |
| JP | 60-198630 | 10/1985 |

(Continued)

OTHER PUBLICATIONS

U.S. Appl. No. 10/721,603, filed Nov. 25, 2003, entitled "Light-Emitting Stylus and User Input Device Using Same".

(Continued)

*Primary Examiner*—Ricardo Osorio (57) ABSTRACT

The present disclosure provides a passive light stylus that produces a defined intensity profile detectable by a user input device when at least a portion of a tip of the stylus is proximate an input surface of the user input device. In some embodiments, the stylus includes a housing including an entrance aperture configured to collect ambient light and an exit aperture configured to emit the collected light, where the exit aperture is proximate a tip of the stylus. The stylus also includes a light guide disposed within the housing, where the light guide is in optical communication with the entrance aperture and the exit aperture such that the light guide directs collected light from the entrance aperture to the exit aperture.

34 Claims, 3 Drawing Sheets

FOREIGN PATENT DOCUMENTS

| | | |
|---|---|---|
| JP | 60-200388 | 10/1985 |
| JP | 61-006729 | 1/1986 |
| JP | 61-075423 | 4/1986 |
| JP | 10-187348 | 7/1998 |
| JP | 10-283113 | 10/1998 |
| JP | 11-282628 | 10/1999 |
| JP | 2003-66417 | 3/2003 |
| WO | WO 03/058588 | 7/2003 |
| WO | WO 03/071345 | 8/2003 |

OTHER PUBLICATIONS

U.S. Appl. No. 10/721,685, filed Nov. 25, 2003, entitled "Light Emitting Stylus and User Input Device Using Same".

* cited by examiner

PASSIVE LIGHT STYLUS AND USER INPUT DEVICE USING SAME

This disclosure relates to a passive light stylus and the use of a passive light stylus in a user input device.

BACKGROUND

Touch sensors have become an increasingly common way for users to intuitively interact with electronic systems, typically those that include displays for viewing information. In many applications, the information is viewed through the touch-sensitive area so that the user seems to interact directly with the displayed information. Depending on the technology of the input device, a user may interact with the device using a finger or some other touch implement such as a stylus. When a stylus is used, it can be a passive object (as is typical for those used with resistive touch screens, for example, in a personal digital assistant or other hand-held device) or an active object (as is typical for those used with signature capture devices). A passive stylus can include a simple pen-shaped object that contacts a touch screen.

SUMMARY

The present disclosure provides a passive light stylus for use with a user input device.

In one aspect, the present disclosure provides a stylus for use with a user input device that includes a housing including an entrance aperture configured to collect ambient light and an exit aperture configured to emit the collected light, where the exit aperture is proximate a tip of the stylus. The stylus further includes a light guide disposed within the housing, where the light guide is in optical communication with the entrance aperture and the exit aperture such that the light guide directs collected light from the entrance aperture to the exit aperture. The stylus produces a defined intensity profile detectable by the user input device when at least a portion of the tip of the stylus is proximate an input surface of the user input device.

In another aspect, the present disclosure provides a user input device that includes a plurality of light sensors disposed to detect light transmitted through an input surface of the user input device. The user input device also includes a stylus configured to collect ambient light and emit the collected light through a tip of the stylus, where the stylus produces a defined intensity profile detectable by the user input device when at least a portion of the tip of the stylus is proximate the input surface of the user input device. The user input device further includes electronics coupled to the plurality of light sensors and configured to determine the location of the defined intensity profile produced by the stylus at a reference plane.

In another aspect, the present disclosure provides an electronic display system that includes a user input device. The user input device includes a plurality of light sensors disposed to detect light transmitted through an input surface of the user input device. The user input device also includes a stylus configured to collect ambient light and emit the collected light through a tip of the stylus, where the stylus produces a defined intensity profile detectable by the plurality of light sensors of the user input device when at least a portion of the tip of the stylus is proximate the input surface of the user input device. The user input device also includes electronics coupled to the plurality of light sensors and configured to determine the location of the defined intensity profile produced by the stylus at a reference plane. The electronic display system also includes an electronic display disposed to display information through the input surface of the user input device.

In another aspect, the present disclosure provides a method for using an input device that includes providing a stylus configured to collect ambient light and emit the collected light through a tip, where the stylus produces a defined intensity profile. The method further includes providing an input device including a plurality of light sensors disposed to detect the defined intensity profile produced by the stylus when the defined intensity profile is transmitted through an input surface of the input device. The method further includes positioning the stylus proximate the input surface of the input device, detecting the defined intensity profile only when at least a portion of the tip of the stylus is proximate the input surface of the input device, and determining the location of the defined intensity profile at a reference plane.

The above Summary of the present disclosure is not intended to describe each disclosed embodiment or every implementation of the present disclosure. The Figures and the Detailed Description that follow more particularly exemplify these embodiments.

DETAILED DESCRIPTION

The present disclosure relates to a passive light stylus and its use with a light sensitive user input device (hereinafter referred to as a "user input device"). In some embodiments, the present disclosure provides a stylus that collects ambient light and directs the collected light toward an input surface of the user input device. Using the collected light, the stylus produces a defined intensity profile that is detectable by the user input device when at least a portion of a tip of the stylus is proximate an input surface of the user input device.

The styli of the present disclosure can be used and detected in much the same way that an active light-emitting stylus is used. In contrast to an active light-emitting stylus, a passive stylus does not require a power supply. In addition, a passive stylus may also have the advantage of not being detectable unless a tip of the stylus is very near or in contact with an input surface of a user input device. Some active styli require a switching mechanism to control detection. Such mechanisms can fail over time due to use. Passive styli, on the other hand, do not require such switching mechanisms.

Figure 1:
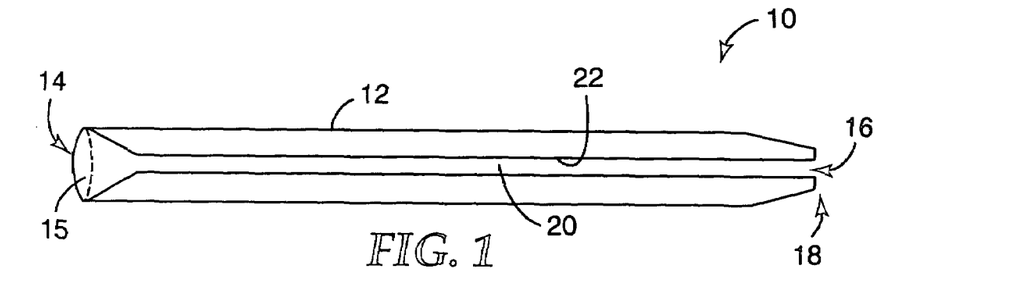
FIG. 1 is a schematic cross-sectional diagram of an embodiment of a stylus.

FIG. 1 is a schematic cross-sectional diagram of an embodiment of a stylus 10. The stylus 10 includes a housing 12 and a light guide 20 disposed within the housing 12. The housing 12 includes an entrance aperture 14 and an exit aperture 16 proximate a tip 18 of the stylus 10. In the embodiment illustrated in FIG. 1, the entrance aperture 14 is located proximate an end of the housing 12 opposite the tip 18. Any suitable material or materials may be used to form housing 12. Further, housing 12 can take any suitable form. It may be preferred that the housing 12 is configured such that it is capable of being easily held and maneuvered by a human hand.

Proximate the end of the housing 12 opposite the tip 18 is the entrance aperture 14. In the embodiment shown in FIG. 1, the entrance aperture 14 is configured to collect ambient light. As used herein, the term "ambient light" refers to light that is present in the environment around a detecting or interpreting device, such as a user input device, and generated from outside sources. Ambient light can include light produced by a user input device. In some embodiments, the entrance aperture 14 may be positioned proximate the tip 18 of stylus 10 as is further described herein, or it may be located at any suitable position along housing 12. The entrance aperture 14 may take any suitable shape for collecting ambient light, e.g., circular, rectangular, polygonal, cylindrical. In some embodiments, the entrance aperture 14 may include a portion that recesses into the housing in any suitable shape, e.g., frustoconical. The entrance aperture 14 can include one or more apertures configured to collect light. Further, entrance aperture 14 may include any suitable surface, e.g., reflective, absorptive, textured. It may be preferred that the surface of entrance aperture 14 includes a multilayer polymeric optical film such as those described, e.g., in U.S. Pat. No. 6,080,467 to Weber et al., entitled HIGH EFFICIENCY OPTICAL DEVICES.

An optional collector 15 may be positioned proximate entrance aperture 14 to assist in collecting ambient light. Any suitable collector 15 may be used, e.g., lens or lenses, domed lenses, etc.

Proximate the tip 18 of housing 12 is the exit aperture 16. The exit aperture 16 is configured to emit light collected by the entrance aperture 14. In other words, the exit aperture 16 pipes or directs light collected by the entrance aperture 14 away from the tip 18 of stylus 10. The exit aperture 16 may take any suitable shape for emitting light, e.g., circular, rectangular, polygonal, etc. The exit aperture 16 may include any suitable surface that is conducive to emitting light, e.g., a transparent surface or a reflective surface. It may be preferred that the surface of the exit aperture 16 include a multilayer polymeric optical film such as those described, e.g., in U.S. Pat. No. 6,080,467.

Disposed within the housing 12 of stylus 10 is the light guide 20. As shown in FIG. 1, the light guide 20 is in optical communication with the entrance aperture 14 and the exit aperture 16 such that the light guide 20 directs collected light from the entrance aperture 14 to the exit aperture 16. The light guide 20 can include any suitable material or materials, e.g., glass, polymeric. In some embodiments, the light guide 20 can include one or more optical fibers, e.g., polymer-clad silica fibers. In some embodiments, the light guide 20 may include an inner space that is filled with air or other medium for directing light. Further, in some embodiments, the light guide may be an integral part of the housing 12. In other words, the housing 12 may include an inner space that is filled with air or other medium for directing light. In other embodiments, the light guide 20 can be a reflective inner surface of the housing 12. Any suitable reflective inner surface may be included, e.g., metal, polymeric, painted, etc. It may be preferred that the reflective inner surface of the housing include a multilayer polymeric optical film such as those described, e.g., in U.S. Pat. No. 6,080,467. It may be preferred that the reflective inner surface reflects at least 80% of light incident thereon. It may be more preferred that the reflective inner surface reflects at least 95% of light incident thereon. It may be even more preferred that the reflective inner surface reflects at least 99% of light incident thereon.

In operation, the stylus 10 produces a defined intensity profile detectable by a user input device when at least a portion of the tip 18 of the stylus 10 is proximate an input surface of the user input device as is further described herein. When at least a portion of the tip 18 of stylus 10 is proximate the input surface of the user input device, the tip 18 can either be in contact with the input surface or at least within a distance from the input surface that is sufficiently small so that the detectable intensity profile is maintained at least at the level of the input surface. Further, as used herein, the term "defined intensity profile" refers to a predictable light pattern produced by a stylus of the present disclosure, the light pattern having one or more dark regions that at least partially surround one or more light regions, where the contrast between the one or more dark regions and the one or more light regions is sufficient for detection by a user input device. What constitutes sufficiency for detection can be adjusted by setting detection thresholds, with the caveat that lower thresholds may result in a device that is more susceptible to noise.

Figure 2A:
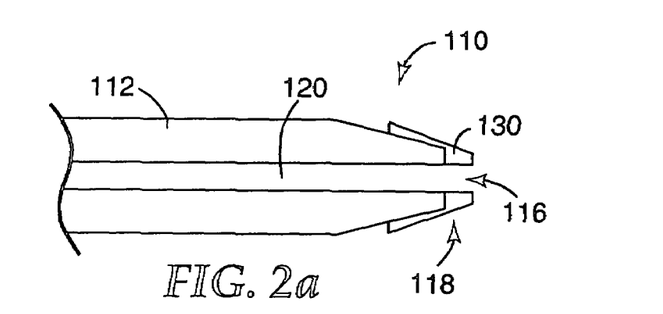
FIG. 2(a) is a schematic cross-sectional diagram of an embodiment of a portion of a stylus that includes a conformable member proximate a tip of the stylus.
Figure 2B:
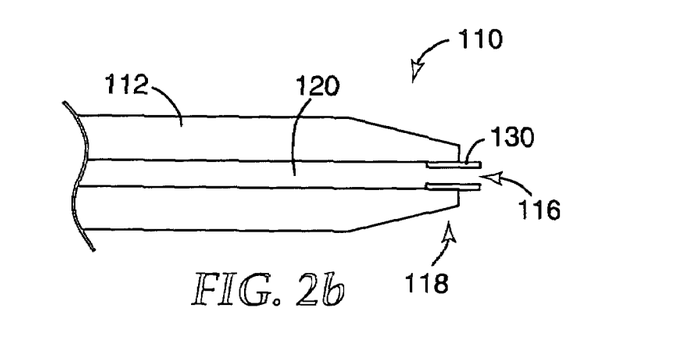
FIG. 2(b) is a schematic cross-sectional diagram of another embodiment of a portion of a stylus that includes a conformable member proximate a tip of the stylus.

FIGS. 2(a)-(b) schematically illustrate some non-limiting embodiments of styli according to the present disclosure. FIG. 2(a) is a schematic cross-sectional diagram of an embodiment of a portion of a stylus 110 that includes a housing 112 and a light guide 120 disposed within the housing 112. Stylus 110 also includes an entrance aperture (not shown) for collecting ambient light, and an exit aperture 116 proximate a tip 118 of the stylus 110 for emitting light. All of the design considerations and possibilities described herein with respect to the housing 12, the light guide 20, the entrance aperture 14, and the exit aperture 16 of the embodiment illustrated in FIG. 1 apply equally to the housing 112, the light guide 120, the entrance aperture (not shown), and the exit aperture 116 of the embodiment illustrated in FIGS. 2(a)-(b).

The stylus 110 also includes a conformable member 130 proximate the tip 118 of the stylus 110. The conformable member 130 can be made of any suitable material or materials, e.g., polymeric, rubber, silicone. The conformable member 130 is configured to contact an input surface of a user input device. The conformable member 130 may allow the stylus 110 to contact the input surface of the user input device such that a defined intensity profile is produced by the stylus 110. Further, the conformable member 130 may also allow a user to more easily contact the input surface with the stylus 110 without damage to the input surface. In addition, the conformable member 130 may allow the user to more easily drag the tip 118 of the stylus across the input surface while scrolling through menus or writing text.

In some embodiments, the conformable member 130 is integral with the housing 112 of stylus 110. Alternatively, in some embodiments, the conformable member 130 may be a separate member that is connected to the tip 118 of stylus 110 in any suitable manner. For example, as illustrated in FIG. 2(a), the conformable member 130 includes a sleeve that fits over the housing 112 proximate the tip 118 and extends beyond the housing 112 to form the exit aperture 116.

FIG. 2(b) is a schematic cross-sectional diagram of another embodiment of a portion of a stylus 110 that includes a conformable member 130 having a portion that is located within the housing 112 of stylus 110 and another portion that extends beyond the housing 112 to form an exit aperture 116.

Figure 3:
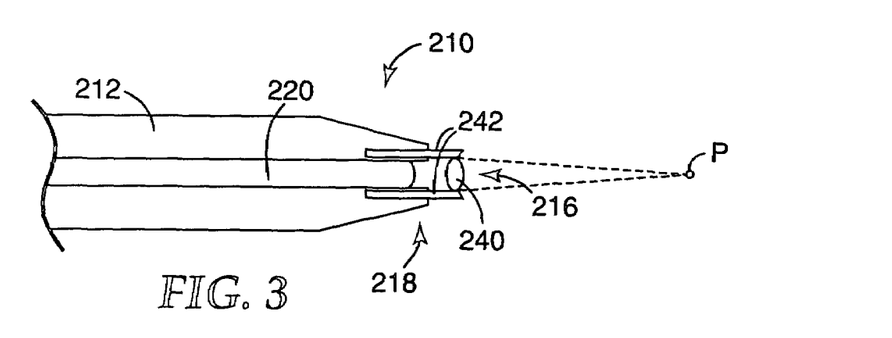
FIG. 3 is a schematic cross-sectional diagram of an embodiment of a portion of a stylus that includes an optical element proximate a tip of the stylus.

The passive light styli of the present disclosure can also include one or more optical elements in optical communication with a light guide to produce a defined intensity profile. For example, FIG. 3 is a schematic cross-sectional diagram of an embodiment of a portion of a stylus 210 that includes a housing 212 and a light guide 220 disposed within the housing 212. The stylus 210 can include any suitable stylus described herein, e.g., stylus 10 of FIG. 1. The stylus 210 also includes an optical element 240 proximate a tip 218 of the stylus 210. The optical element 240 can include any suitable optical element or elements, e.g., lenses, etc. The optical element 240 can be positioned proximate the tip 218 of the stylus 210 such that it is in optical communication with the light guide 220. As shown in FIG. 3, the optical element 240 is positioned proximate the tip 218 using supports 242. Although the optical element 240 is shown as being positioned outside of housing 212, in some embodiments, the optical element 240 may be positioned within the housing 212.

In general, light is collected by an entrance aperture (e.g., entrance aperture 14 of FIG. 1) and directed by the light guide 220 through the optical element 240. The optical element 240 in turn focuses the emitted light to a point P, thereby producing a defined intensity profile that is detectable by a user input device as is further described herein.

As is also described herein, the passive light styli of the present disclosure produce defined intensity profiles that are detectable by a user input device. In some embodiments, a stylus may be configured such that a light beam emitted by the stylus may have a property that abruptly changes when at least a portion of a tip of the stylus sufficiently contacts an input surface of a user input device as is further described in co-assigned and co-pending U.S. patent application Ser. No. 10/721,603, filed Nov. 25, 2003.

Figure 4A:
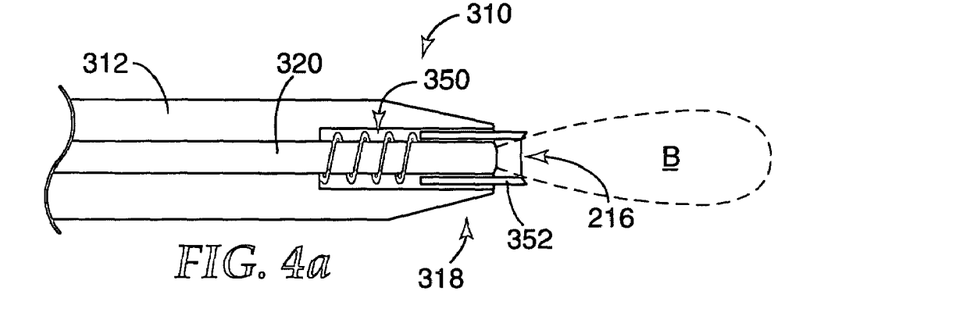
FIG. 4(a) is a schematic cross-sectional diagram of an embodiment of a portion of a stylus that includes a resilient member coupled to a cylinder positioned within a housing of the stylus proximate a tip of the stylus.
Figure 4B:
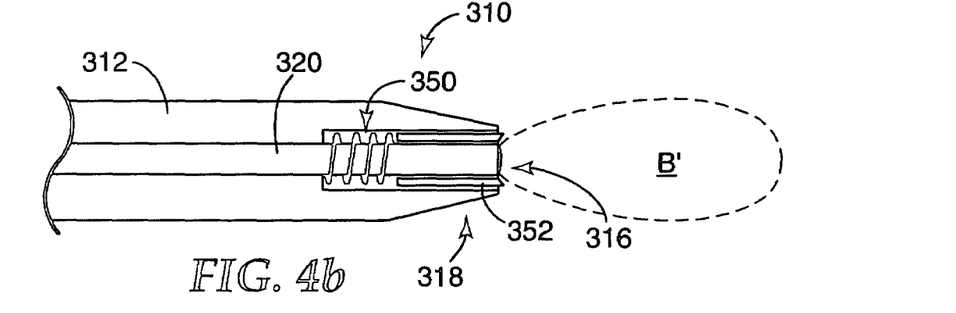
FIG. 4(b) is a schematic cross-sectional diagram of the portion of the stylus of FIG. 4(a) with at least a portion of the tip of the stylus contacting an input surface of a user input device.

For example, FIGS. 4(a)-(b) schematically illustrate some non-limiting examples of mechanisms for abruptly changing a property of a light beam emitted by a stylus according to the present disclosure. FIGS. 4(a)-(b) illustrate a portion of a passive light stylus 310 that includes a housing 312 and a light guide 320 disposed within the housing 312. FIG. 4(a) indicates a tip position when the stylus 310 is not in contact with a surface, and FIG. 4(b) indicates a tip position when the stylus 310 is contacting a surface. Stylus 310 may include any suitable stylus described herein, e.g., stylus 10 of FIG. 1.

Also positioned within the housing 312 is a resilient member 350 coupled to a cylinder 352. The cylinder 352 forms an exit aperture 316. The cylinder 352 is slidably coupled to a tip 318 of housing 312 such that the cylinder 352 changes the cross-sectional area of the emitted light beam when at least a portion of the cylinder 352 is in contact with an input surface of a user input device. As shown, when the cylinder 352 is not in contact with a surface (FIG. 4(a)), the exit aperture 316 is farther away from the end of the light guide 320, resulting in a narrower beam spread B. When the tip 318 is in contact with a surface (FIG. 4(b)), the exit aperture 316 is closer to the end of the light guide 320, resulting in a broader beam spread B'.

Figure 5:
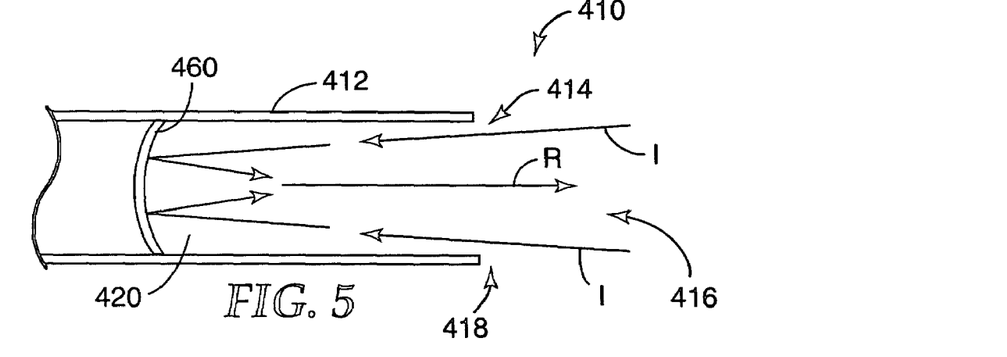
FIG. 5 is a schematic cross-sectional diagram of an embodiment of a portion of a stylus that includes an entrance aperture proximate a tip of the stylus.

Various other embodiments of styli according to the present disclosure may include alternative positioning of either or both of the entrance aperture and the exit aperture. For example, FIG. 5 is a schematic cross-sectional diagram of an embodiment of a portion of a stylus 410 that includes a housing 412 and a light guide 420 disposed within the housing 412. All of the design considerations and possibilities described herein with respect to the housing 12 and the light guide 20 of the embodiment illustrated in FIG. 1 apply equally to the housing 412 and the light guide 420 of the embodiment illustrated in FIG. 5. One difference between the stylus 10 of FIG. 1 and the stylus 410 of FIG. 5 is that the stylus 410 includes an entrance aperture 414 proximate a tip 418 of the stylus 410. Another difference is that the stylus 410 also includes a reflector 460 disposed within the housing 412. Any suitable reflector may be used, e.g., metal, polymeric, etc. The reflector 460 may also include any suitable shape, e.g., parabolic, elliptical, etc.

In general, the entrance aperture 414 collects ambient light, including light that may be emitted by an input device proximate the tip 416. The collected ambient light is represented as beam I in FIG. 5. The collected light I is directed by the light guide 420 to the reflector 460. Reflector 460 then directs the light R back through the light guide 420 where it is emitted by an exit aperture 416 proximate the tip 418 of stylus 410. The stylus 410 produces a defined intensity profile that is detectable by a user input device when at least a portion of the tip 418 of the stylus 410 is proximate (i.e., sufficiently close to or in contact with) an input surface of the device. If the tip 418 of the stylus 410 is in contact with the input surface, most of the light collected by the entrance aperture 414 will be light emitted by the user input device.

Figure 6:
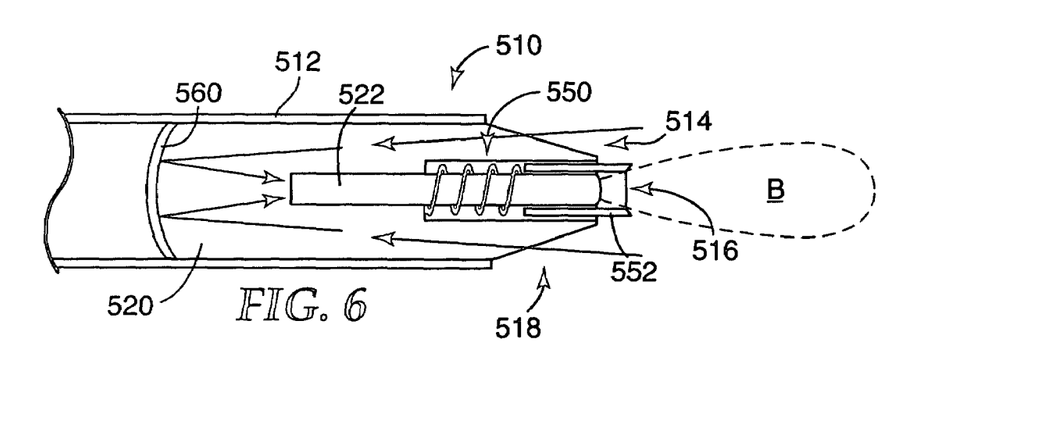
FIG. 6 is a schematic cross-sectional diagram of another embodiment of a portion of a stylus that includes an entrance aperture proximate a tip of the stylus and a resilient member coupled to a cylinder positioned within a housing of the stylus proximate the tip of the stylus.

Alternatively, the present disclosure also includes a stylus that collects and emits light proximate a tip of the stylus and also includes a mechanism for abruptly changing a property of the emitted light. For example, FIG. 6 is a schematic cross-sectional diagram of another embodiment of a portion of a stylus 510 that includes an entrance aperture 514 proximate a tip 518 of the stylus 510. Stylus 510 is similar in many respects to stylus 410 of FIG. 5. For example, the stylus 510 includes a housing 512 and a first light guide 520 disposed within the housing 512. The stylus 510 also includes a reflector 560 disposed within the housing 512 to reflect light collected by the entrance aperture 514. One difference between the stylus 410 of FIG. 5 and that of stylus 510 of FIG. 6 is that stylus 510 also includes a resilient member 550 coupled to a cylinder 552 positioned within the housing 512 of the stylus 510 proximate the tip 518 of the stylus 510. The stylus 510 also includes a second light guide 522 that is in optical communication with the first light guide 520 such that light reflected by reflector 560 is directed through the first light guide 520 and into the second light guide 522.

The cylinder 552 forms the exit aperture 516 of the stylus 510. The cylinder 552 is slidably coupled to the tip 518 such that the cylinder 552 changes the cross-sectional area of the emitted light when at least a portion of the cylinder 552 is in contact with the input surface of a user input device. As described herein with reference to FIGS. 4(a)-(b), the exit aperture 516 controls the spread of the light beam emitted from the end of the second light guide 522. FIG. 6 shows the stylus 510 when the cylinder 552 is not in contact with a surface. As such, the exit aperture 516 is farther away from the end of the second light guide 522. When the cylinder 552 is in contact with a surface (not shown), the exit aperture 516 is closer to the end of the light second light guide 522, resulting in a broader beam spread.

In general, ambient light, including light emitted by a user input device proximate the tip 518 of the stylus 510, is collected by the entrance aperture 514. The first light guide 520, which is in optical communication with the entrance aperture 514, directs the light to reflector 560, where it is directed back through the first light guide 520 and into the second light guide 522. Second light guide 522 then directs the reflected light through the exit aperture 516.

Figure 7A:
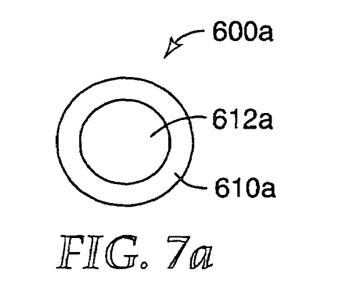
FIGS. 7(a)-(c) are schematic diagrams of various embodiments of defined intensity profiles that may be produced by a stylus of the present disclosure.
Figure 7B:
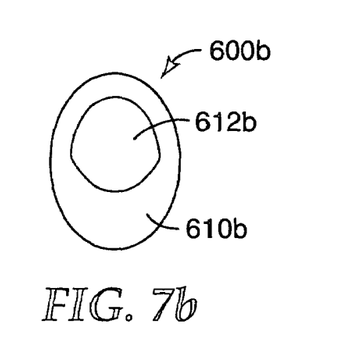
Figure 7C:
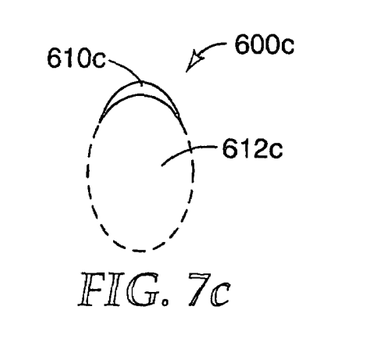

As described herein, the styli of the present disclosure produce defined intensity profiles detectable by a user input device. Any defined intensity profile that is suitable for detection may be produced. For example, FIGS. 7(a)-(c) are schematic diagrams of various embodiments of defined intensity profiles that may be produced by a stylus of the present disclosure. In FIG. 7(a), a defined intensity profile 600(a) includes a dark region 610(a) and a light region 612(a). The dark region 610(a) surrounds light region 612(a). Such an intensity profile 600(a) provides a contrast between the dark region 610(a) and the light region 612(a) that is detectable by the user input device. In other words, defined intensity profile 600(a) can be distinguished by a user input device over other background noise, e.g., shadows produced the user's hand, ambient light patterns, etc.

The defined intensity profile 600(a) may be any suitable size and shape such that it is detectable by the user input device. Defined intensity profile 600(a) may be produced by a stylus when the stylus is proximate an input surface (i.e., sufficiently close to or in contact with the input surface). If the stylus tip is in contact with the input surface, then the stylus may be substantially normal to the input surface to produce intensity profile 600(a). It may be preferred that the size of the intensity profile 600(a) is large enough so that a sufficient number of light sensors are exposed so that the profile 600(a) can be detected.

FIG. 7(b) illustrates another defined intensity profile 600(b) that includes a dark region 610(b) that surrounds a light region 612(b). Such a profile may be produced when a tip of the stylus (e.g., tip 18 of stylus 10 of FIG. 1) is in contact with an input surface of a user input device at an angle to the input surface's normal vector. As described herein, the tip may include a conformable member (e.g., conformable member 130 of stylus 110 of FIG. 2(a)) that partially conforms to the input surface. The conformal nature of such a stylus can allow the stylus to emit an intensity profile that is distinguishable by a user input device over other background profiles.

Another defined intensity profile 600(c) is illustrated in FIG. 7(c). Defined intensity profile 600(c) includes a dark region 610(c) that partially surrounds a light region 612(c) such that a user input device may distinguish defined intensity profile 600(c) over other background profiles. Defined intensity profile 600(c) may be produced by a stylus of the present disclosure when the stylus is in contact with an input surface at a glancing angle to the input surface. At such an angle, only a portion of the tip of the stylus may be in contact with the input surface, thereby producing dark region 610(c).

Figure 8A:
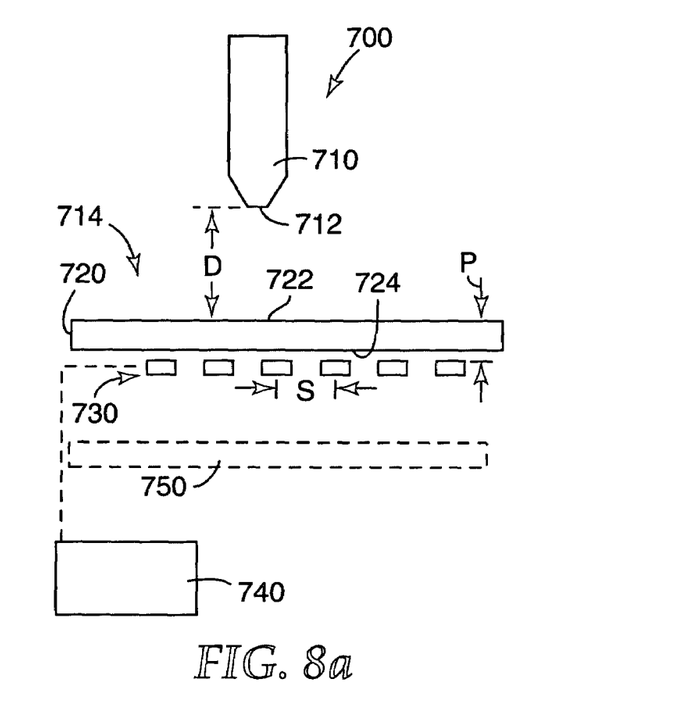
FIGS. 8(a)-(b) are schematic diagrams of an embodiment of one way of using a passive light stylus in a user input device.
Figure 8B:
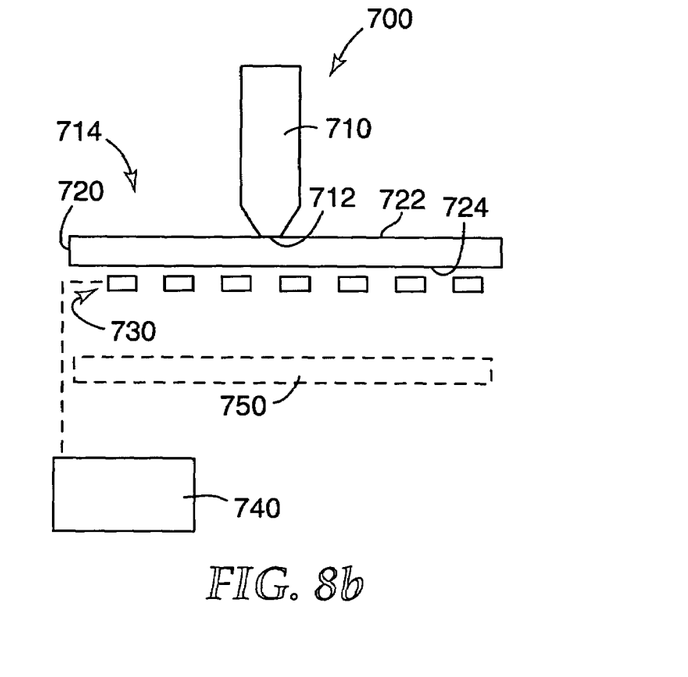

FIGS. 8(a)-(b) are schematic diagrams of an embodiment of one way of using a passive light stylus 710 in a user input device 714. Electronic display system 700 includes a stylus 710 and a user input device 714. Stylus 710 may be any stylus described herein. Stylus 710 is configured to collect light and emit the collected light through a tip 712 of the stylus 710. The stylus 710 produces a defined intensity profile detectable by the user input device 714 when at least a portion of the tip 712 of the stylus 710 is proximate (i.e., within a sufficiently small distance of, for example a distance predetermined by a threshold, or in contact with) a surface.

System 700 also includes user input device 714, which includes a layer 720 and light sensors 730. The layer 720 includes an input surface 722. The light sensors 730 are configured to sense light transmitted through the input surface 722. If input surface 722 is a surface of layer 720, the light sensors 730 can be disposed on opposing surface 724 of layer 720, or the light sensors 730 can be provided in any other manner so that input surface 722 is interposed between the stylus 710 and the light sensors 730. For example, the light sensors 730 can be formed as part of an electronic display, and layer 720 can be a layer of that display, or a layer disposed over (whether in contact with or apart from) that display.

By knowing which of the sensors 730 are sensing the emitted light, the position of the defined intensity profile at the input surface, or other reference plane, can be determined. The stylus 710 and light sensors 730 can thus be used as a user input device by associating various functions of an electronic system or display with the positional information. An exemplary array of light sensors is an array of photo diodes, such as those disclosed in the following publications: WO 03/071345; U.S. Pat. No. 6,337,918; U.S. Pat. No. 5,838,308; JP 10-187348; JP 10-283113; JP 58-086674; JP 60-198630; JP 60-200388; JP 61-006729; JP 61-075423; JP 11-282628; and JP 2003-66417. Other suitable arrays of light sensors include the light-emitting devices of organic electroluminescent displays (OLEDs) as disclosed in International Publication WO 03/058588. In addition to emitting light, OLED devices can also detect light. As disclosed in WO 03/058588, by properly modulating the emitting and detecting functions of OLED devices, display pixels can perform a dual function seemingly simultaneously. As such, it may be possible to fit existing OLED displays with new electronics to convert the existing displays into dual function displays and input devices. The pixel transistors already provided in active matrix liquid crystal displays (AMLCDs) can also be used to detect light. Light sensor arrays can be provided as a separate device coupled to the user input system, as a separate layer in a user input system, or as an integral part of a display device. When the light sensors 730 are integrated into a display device such as an LCD, it may be desirable to locate such sensors 730 within areas covered by the black matrix, for example, so that there is little or no reduction in pixel area. In such a case, it may be desirable to form apertures in the black matrix aligned with the light sensors 730 to allow light to reach the light sensors 730. This can be done during patterning of the black matrix.

The light sensors 730 are disposed to sense light transmitted through the layer 720. Light sensors 730 are spaced a distance S apart, center-to-center, and are set a distance P below the input surface 722. The defined intensity profile produced by the stylus 710 includes a diameter at the plane of the sensors 730. To increase the likelihood that the defined intensity profile will be detected at all locations, the diameter of the defined intensity profile is desirably on the order of detector spacing S. In this case, the positional resolution of profile location determination is equal to 1/S.

The user input device 714 also includes electronics 740 coupled to the light sensors 730. The electronics 740 can include any suitable electronics, e.g., controller(s), software, etc. The electronics 740 are configured to determine the location of the defined intensity profile produced by the stylus 710 at a reference plane. The reference plane can be positioned in any suitable location. It may be preferred that the reference plane is the input surface 722 of layer 720.

User input device 714 can also include an optional electronic display 750. When a display 750 is included, the input surface 722 can include an exterior surface of the electronic display 750. Any suitable display may be included, e.g., liquid crystal display, organic electroluminescent display. When a display 750 is included, it may be preferred that the light sensors 730 are integrated into a transistor array that controls pixels of the electronic display 750 as is described, e.g., in U.S. Pat. No. 6,028,581. The electronic display 750 is disposed to display information through the input surface 722 of the user input device 714.

In FIG. 8(*a*), the tip 712 of stylus 710 is a distance D from the input surface 722. It may be preferred that the light sensors 730 are controlled such that the defined intensity profile produced by the stylus 710 is detected only when at least a portion of the tip 712 of the stylus is proximate the input surface 722 of the input device 714. As shown in FIG. 8(*a*), the tip 712 of the stylus 710 is at distance D such that the tip 712 is not proximate the input surface 722. Therefore, the user input device 714 does not detect the defined intensity profile produced by the stylus 710.

In FIG. 8(*b*), the tip 712 of stylus 710 is proximate the input surface 722. User input device 714 then detects the defined intensity profile. The electronics 740 then determine the location of the defined intensity profile produced by the stylus 710 at a reference plane, e.g., the input surface 722. Any suitable image processing technique may be used to determine the location of the stylus 710, e.g., WO 03/071,345.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the invention is to be limited only by the claims provided below.

What is claimed is:

1. A stylus for use with a user input device, comprising:
   a housing comprising an entrance aperture configured to collect ambient light and an exit aperture configured to emit the collected light, wherein the exit aperture is proximate a tip of the stylus; and
   a light guide disposed within the housing, wherein the light guide is in optical communication with the entrance aperture and the exit aperture such that the light guide directs collected light from the entrance aperture to the exit aperture;
   wherein the stylus produces a defined intensity profile detectable by the user input device when at least a portion of the tip of the stylus is proximate an input surface of the user input device.

2. The stylus of claim 1, wherein the entrance aperture is proximate an end of the housing opposite the tip.

3. The stylus of claim 1, wherein the entrance aperture is proximate the tip.

4. The stylus of claim 3, wherein the entrance aperture is configured to collect ambient light including light emitted by the user input device.

5. The stylus of claim 1, wherein the entrance aperture comprises a collector to collect ambient light.

6. The stylus of claim 5, wherein the collector comprises a lens.

7. The stylus of claim 1, wherein the light guide is an integral part of the housing.

8. The stylus of claim 7, wherein the light guide comprises a reflective inner surface of the housing.

9. The stylus of claim 1, wherein the light guide comprises a multilayer polymeric optical film.

10. The stylus of claim 9, wherein the multilayer polymeric optical film reflects at least 80% of light incident thereon.

11. The stylus of claim 10, wherein the multilayer polymeric optical film reflects at least 95% of light incident thereon.

12. The stylus of claim 11, wherein the multilayer polymeric optical film reflects at least 99% of light incident thereon.

13. The stylus of claim 1, wherein the stylus comprises an optical element proximate the tip of the stylus in optical communication with the light guide, wherein the optical element focuses the emitted light to a point.

14. The stylus of claim 1, wherein the tip of the stylus comprises a conformable member that is configured to contact the input surface of the user input device.

15. The stylus of claim 14, wherein the conformable member is an integral part of the housing.

16. The stylus of claim 14, wherein a portion of the conformable member is located within the housing and another portion extends beyond the housing to form the exit aperture.

17. The stylus of claim 14, wherein the conformable member comprises a sleeve that fits over the housing proximate the tip and extends beyond the housing to form the exit aperture.

18. The stylus of claim 14, wherein the conformable member comprises a polymeric material.

19. The stylus of claim 14, wherein the conformable member comprises rubber.

20. The stylus of claim 1, wherein the stylus further comprises a resilient member coupled to a cylinder positioned within the housing proximate the tip, wherein the cylinder forms the exit aperture, wherein the cylinder is slidably coupled to the tip such that the cylinder changes the cross-sectional area of the emitted light when at least a portion of the tip is in contact with the input surface of the user input device.

21. The stylus of claim 1, wherein the defined intensity profile comprises a dark region at least partially surrounding a light region, wherein the contrast between the dark region and the light region is detectable by the user input device.

22. A user input device, comprising:
- a plurality of light sensors disposed to detect light transmitted through an input surface of the user input device;
- a stylus configured to collect ambient light and emit the collected light through a tip of the stylus, wherein the stylus produces a defined intensity profile detectable by the user input device when at least a portion of the tip of the stylus is proximate the input surface of the user input device; and
- electronics coupled to the plurality of light sensors and configured to determine the location of the defined intensity profile produced by the stylus at a reference plane.

23. The device of claim 22, wherein the stylus further comprises:
- a housing comprising an entrance aperture configured to collect ambient light and an exit aperture configured to emit the collected light, wherein the exit aperture is proximate the tip of the stylus; and
- a light guide disposed within the housing, wherein the light guide is in optical communication with the entrance aperture and the exit aperture such that the light guide directs the collected light from the entrance aperture to the exit aperture.

24. The device of claim 22, wherein the input surface comprises an exterior surface of an electronic display.

25. The device of claim 24, wherein the electronic display comprises a liquid crystal display.

26. The device of claim 24, wherein the electronic display comprises an organic electroluminescent display.

27. The device of claim 24, wherein the plurality of light sensors are integrated into a transistor array that controls pixels of the electronic display.

28. The device of claim 22, wherein the reference plane is the input surface.

29. An electronic display system, comprising:
- a user input device, wherein the user input device comprises:
  - a plurality of light sensors disposed to detect light transmitted through an input surface of the user input device;
  - a stylus configured to collect ambient light and emit the collected light through a tip of the stylus, wherein the stylus produces a defined intensity profile detectable by the plurality of light sensors of the user input device when at least a portion of the tip of the stylus is proximate the input surface of the user input device; and
  - electronics coupled to the plurality of light sensors and configured to determine the location of the defined intensity profile produced by the stylus at a reference plane; and
- an electronic display disposed to display information through the input surface of the user input device.

30. The system of claim 29, wherein the electronic display is a liquid crystal display.

31. The system of claim 30, wherein the plurality of light sensors is incorporated into the liquid crystal display.

32. The system of claim 29, wherein the electronic display comprises a plurality of organic electroluminescent light-emitting devices.

33. The system of claim 32, wherein at least a portion of the plurality of organic electroluminescent light-emitting devices are used as the plurality of light sensors.

34. A method for using an input device, comprising:
- providing a stylus configured to collect ambient light and emit the collected light through a tip, wherein the stylus produces a defined intensity profile;
- providing an input device comprising a plurality of light sensors disposed to detect the defined intensity profile produced by the stylus when the defined intensity profile is transmitted through an input surface of the input device;
- positioning the stylus proximate the input surface of the input device; detecting the defined intensity profile only when at least a portion of the tip of the stylus is proximate the input surface of the input device; and
- determining the location of the defined intensity profile at a reference plane.

* * * * *